[54] FREQUENCY STABILIZATION APPARATUS AND METHOD

[75] Inventors: Harry A. Augenblick, Mountain Lakes, N.J.; Lester F. Eastman, Ithaca, N.Y.; Richard E. Keller, Washington Township, N.J.

[73] Assignee: MICROLAB/FXR, Livingston, N.J.

[22] Filed: Mar. 26, 1971

[21] Appl. No.: 128,461

[52] U.S. Cl. ..................325/105, 325/141, 325/184, 325/186, 331/186

[51] Int. Cl. ..............................................H04b 1/04

[58] Field of Search......................325/105, 141, 159, 325/184, 186, 187; 332/9 R, 16, 18, 19, 37 R, 37 P; 331/107 R, 185, 186, 183

[56] References Cited

UNITED STATES PATENTS

| | | | |
|---|---|---|---|
| 2,492,168 | 12/1949 | Marker | 331/186 |
| 3,177,431 | 4/1965 | Ashley | 325/141 |
| 3,562,666 | 2/1971 | Rode | 325/105 |

*Primary Examiner*—Benedict V. Safourek
*Attorney*—Irving Seidman

[57] ABSTRACT

A frequency stabilization system for stabilizing the frequency of a transmitter of the type comprising an oscillator having an active element, the resonant frequency of which varies as a function of at least the resistance of the element and the difference between a biasing signal and the threshold voltage of the element wherein the transmitter includes control means which is responsive to a control signal for producing the biasing signal and a lead connecting the control means with the element. The system includes first signal means for producing a signal which is proportional to the difference between the biasing signal and the threshold voltage. The first signal means is connected to the element so that a second signal is developed across the element in response to the application of the first signal thereto. The second signal is sensed by sensing means and is applied to one input of a differential amplifier, the other input of which is connected to a reference source. The output of the differential amplifier is connected to the control means so that the differential amplifier produces a control signal which is dependent upon the difference between the sensed second signal and the reference signal thereby to stabilize the frequency of the oscillator.

A transmission system employing the frequency stabilization system and the method of frequency stabilizing the system are also disclosed.

37 Claims, 12 Drawing Figures

INVENTORS
HARRY A. AUGENBLICK
LESTER F. EASTMAN
RICHARD E. KELLER

BY Irving Seidman
ATTORNEY.

INVENTORS
HARRY A. AUGENBLICK
LESTER F. EASTMAN
RICHARD E. KELLER
BY
ATTORNEY.

INVENTORS
HARRY A. AUGENBLICK
LESTER F. EASTMAN
RICHARD E. KELLER
BY
ATTORNEY

FREQUENCY STABILIZATION APPARATUS AND METHOD

This invention relates generally to a frequency stabilization system for stabilizing the frequency of a semiconductor oscillator and to a method employing such frequency stabilization techniques and, more particularly, pertains to a system and method for frequency stabilizing a so-called limited space-charge accumulation device.

At present, there are a number of semi-conductor devices that are generally classified under the term "bulk and transit time devices." Such devices include Gunn Effect diodes (both domain and accumulation layer transferred electronic devices), Impatt diodes (so-called avalanche devices), Trappatt diodes and Read diodes. Any one of these bulk and transit time devices is substantially capable of being operated in a pulsed mode to generate pulse microwave signals. However, use of any one of these devices in a microwave transmitter has been severely curtailed due to the characteristics of these devices.

To be more specific, the operating frequency of the above-described semiconductor diodes is primarily dependent upon the thickness of the device (from electrode to electrode). In order to obtain high power output levels, however, relatively thick devices are required. However, as the thickness of the devices increases, the operating frequency of such devices decreases. Thus, as a result, such devices have not gained wide usage in microwave transmitters.

A relatively new type of diode which is referred to as a "limited space-charge accumulation device" diode (hereinafter referred to as the "LSA" diode) which also falls under the general classification of bulk and transit time devices is becoming commercially available. The major benefit of the LSA diode is that its operating frequency is determined primarily by the parameters of its resonant cavity rather than the thickness of the device. Therefore, such diodes can be utilized at relatively high power levels without affecting the resonant frequency of the device to any great extent.

In practice, and as noted in greater detail hereinbelow, the resonant frequency or operating frequency of a pulsed LSA diode varies as a function of the applied bias voltage, the ambient temperature, and the temperature rise due to the heat dissipation in the diode. If any one of these parameters change, the frequency of the element also changes. However, such frequency variations are intolerable in a microwave system of the type under consideration.

To be more specific, in order to insure that all information is transmitted to the receiver, the band width must be sufficiently wide as to encompass the range of frequencies transmitted by the transmitter and, of necessity, must take into account the frequency variations. The end result of increasing receiver band width is to produce a receiver wherein the receiver sensitivity and therefore system performance are substantially reduced. Additionally, and of more importance, is the fact that such frequency variations in the transmitted signal may cause interference with other transmissions of neighboring communication systems.

Accordingly, an object of the present invention is to provide a frequency stabilization system for stabilizing the frequency of a transmitter utilizing an LSA diode oscillator.

A further object of the present invention is to provide a reliable frequency stabilization system for a transmitter utilizing an LSA diode oscillator which is efficient in operation.

A further object of the present invention resides in the novel details of the circuitry which provide a frequency stabilization system of the type described wherein the frequency may easily be changed by varying a parameter of the system.

Still another object of the present invention is to provide a pulsed LSA diode transmitter which includes a frequency stabilization system.

A further object of the invention is the provision of a frequency stabilization system of the type noted above which provides both long term and short term stabilization.

Accordingly, a frequency stabilization system constructed in accordance with the present invention is utilized to stabilize the frequency of a transmitter of the type comprising an oscillator having an active element the resonant frequency of which varies as a function of at least the resistance of the element and the value of a biasing signal applied to the element. The transmitter further includes control means which is responsive to a control signal for producing the biasing signal, the value of which is dependent on the value of the control signal and a lead which connects the control means with the element. The system comprises first signal means which is adapted to be connected to the element for producing a first signal which is proportional to the biasing signal whereby a second signal is developed across the element in response to the application of the first signal thereto. Sensing means senses the second signal and produces a sensed signal in response thereto. A reference signal source is provided and comparing means is adapted to be connected to the control means for comparing the sensed and referenced signals to produce the control signal in accordance with the difference between the sensed and referenced signals.

A feature of the present invention is to provide a method for controlling the frequency of a microwave transmitter utilizing an LSA diode oscillator element.

Other features and advantages of the present invention will become more apparent from a consideration of the following detailed description when taken in conjunction with the accompanying drawings, in which.

Figures 1, 2, 3:
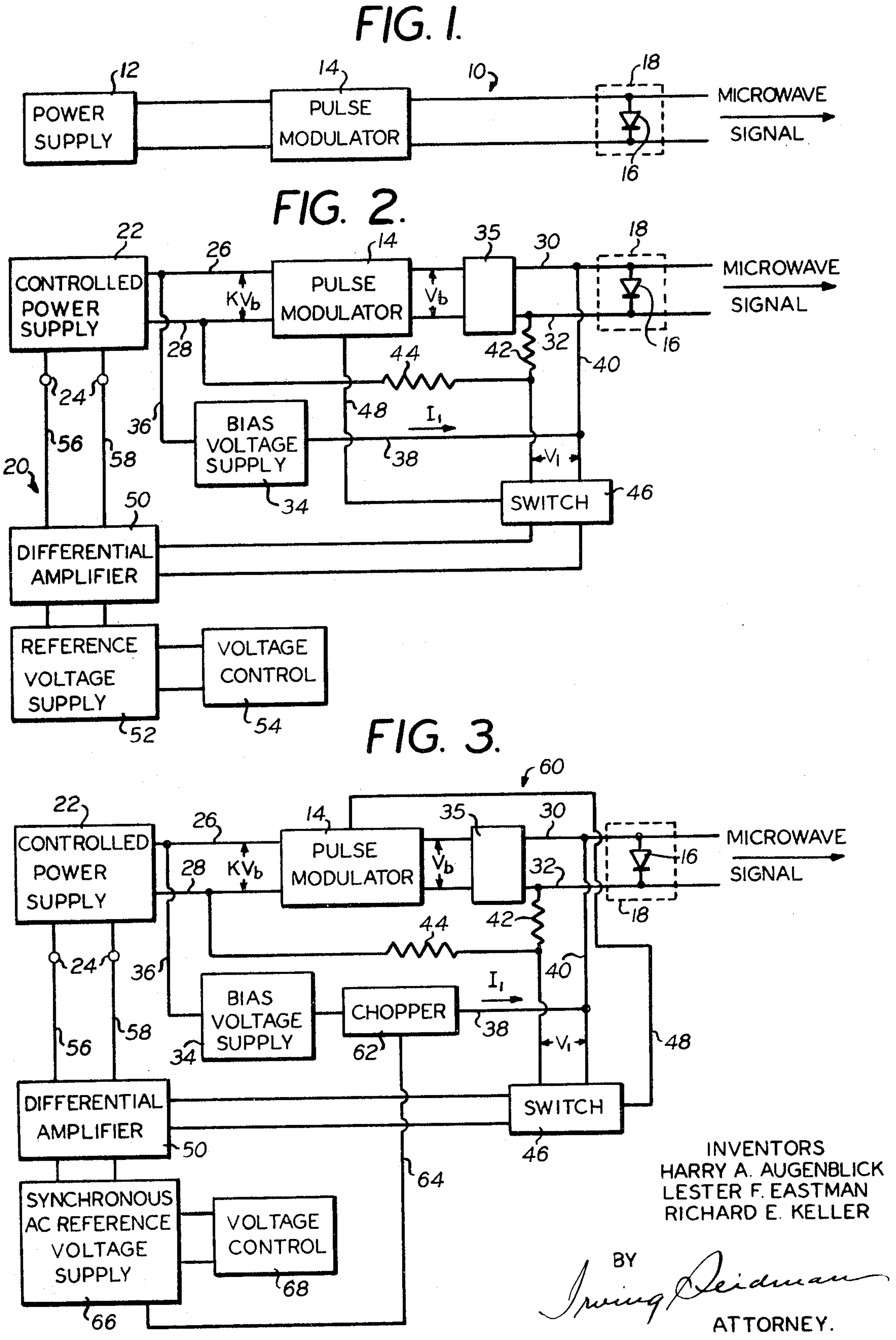
FIG. 1 is a schematic wiring diagram, in block form, of a conventional microwave transmitter employing an LSA diode oscillator.
FIG. 2 is a schematic circuit wiring diagram, in block form, of a transmitter of the type shown in FIG. 1, utilizing a frequency stabilization system constructed according to the present invention.
FIGS. 3 and 4 are schematic circuit wiring diagrams, in block form, of transmitters utilizing modified embodiments of a frequency stabilization system constructed according to the present invention.

It is believed that a reiteration of the principles of operation of a conventional pulsed diode transmitter will facilitate an understanding and an appreciation of the present invention. Accordingly, such a conventional transmitter is illustrated in FIG. 1 and is designated generally by the reference numeral 10 and includes a power supply 12 which supplies a continuous DC output potential to a pulse modulator 14. The output signal from the pulse modulator 14 is applied to an LSA diode 16 which is connected thereto. The diode 16 is received within a cavity which is indicated schematically by the dashed lines 18. The pulse modulator 14 is conventional in construction and produces a pulse when the triggering potential has been reached. That is, the continuous DC potential from the supply 12 causes a charge to accumulate within the modulator. When the charge reaches a preselected value, the modulator operates to produce a pulse. Thereafter, the charge begins to accumulate until the preselected value is again reached, at which time the modulator again produces a pulse. Hence, as long as a DC potential is present at the input terminals of the modulator, the modulator will continuously produce a train of pulses. These pulses or pulsed bias voltage is applied to the diode 16. The diode is operable to convert the energy of the pulsed bias voltage to a microwave signal which is then applied to the remainder of the transmitter chain which may comprise an amplifier and antenna (not shown).

The frequency of the microwave signal produced by the diode 16 is given by the relationship:

$$f=\frac{1}{2\pi\sqrt{LC}+\left(\frac{L}{R_f+R_p}\right)\left(\frac{V_{th}}{2V_b-V_{th}}\right)} \qquad (1)$$

where:

$f$ is the frequency of the microwave signal;
$L$ is the total microwave circuit inductance;
$C$ is the total microwave circuit capacitance;
$R_f$ is the low field resistance of the LSA diode;
$R_p$ is the parasitic resistance of the microwave circuit;
$V_{th}$ is the threshold voltage of the LSA diode; and
$V_b$ is the pulsed bias voltage.

As will be obvious from a consideration of Equation (1), a change in any one of the parameters will effect a change in the frequency of oscillation. In practice, some of these parameters do change during operation of the transmitter and, accordingly, undesirable frequency variations appear in the output signal. To be more specific, the circuit inductance $L$, the circuit capacitance $C$, the parasitic resistance $R_p$ and the threshold voltage $V_{th}$ are fixed parameters and do not contribute to frequency variations of the type under consideration. However, the low field resistance of the diode $R_f$ increases as the temperature of the diode active layer is increased, thereby causing the frequency to increase. This increase in temperature of the diode active layer is due to an increase in the ambient temperature or an increase in the average power which is dissipated in the diode. Moreover, this change in low field resistance may be broken down into long-term changes (i.e., the average change in low field resistance occurring over an interval of time which includes a number of pulses) and short-term changes (i.e., changes in the low field resistance due to the heating effect of the energy dissipated in the diode during a pulse). Additionally, in practice, the pulsed bias voltage $V_b$ may fluctuate due to the inherent operation of such unstabilized supplies and thereby cause variations in the frequency of the output signal. Summarizing the above, the frequency of the microwave signal will therefore vary with changes in the applied bias voltage, the ambient temperature and the average power which is dissipated in the LSA diode.

An examination of Equation (1) shows that if the relationship $$(R_f+R_p)\,(2\,V_b-V_{th}) \qquad (2)$$

is maintained constant the frequency will likewise be maintained constant. Thus, the present invention describes a system and a method which measures the magnitude of Equation (2) and maintains this magnitude constant by varying the pulsed bias voltage $V_b$ thereby to maintain the frequency of the microwave signal constant for long-term changes. Additionally, the system may include means for eliminating short-term frequency changes.

More specifically, a transmitter utilizing a frequency stabilization system constructed in accordance with the present invention is illustrated in FIG. 2 and designated generally by the reference numeral 20. The transmitter 20 includes a controlled power supply 22, the output signal of which is dependent upon the value of a control signal applied to the control input terminals 24 of the power supply. The output terminals of the power supply are connected to the input terminals of the modulator 14 by leads 26 and 28. The output terminals of the modulator 14 are connected across the diode 16 by the leads 30 and 32.

The pulsed bias output voltage $V_b$ of the pulse modulator 14 is proportional to the DC input voltage to the pulse modulator from the controlled power supply 22. Accordingly, the output signal of the power supply 22 may be represented by the expression $KV_b$ where $K$ is a constant of proportionality.

A series chain is connected across the leads 26 and 28 and includes the LSA diode 16. A portion of this series chain may be though of as being first signal means which is adapted to produce a first signal which is proportional to the biasing signal and to apply this first signal to the diode so that the diode produces a second signal in response thereto. More specifically, the series chain includes a bias voltage supply 34 having an input terminal connected to the lead 26 by a lead 36 and an output terminal connected to the lead 30 by leads 38 and 40. The series chain further includes a resistor 42 which is connected to the lead 32, and a resistor 44 which is connected between the resistor 42 and the lead 28.

The output potential of the bias voltage supply 34 is made equal to the quantity - ($KV_{th}/2$). The resistor 42 is made substantially equal to the parasitic resistance $R_p$. On the other hand, the resistance of the resistor 44 is made very high with respect to the sum of both $R_f$, the low field resistance, and $R_p$, the parasitic resistance. For ease of reference, the resistor 44 is designated $R_h$. It is to be noted that the diode 16 may be represented by a resistor having a resistance equal to the value of the low field resistance $R_f$.

An analysis of the circuit thus far described illustrates that the total potential appearing across the series chain is equal to the quantity $KV_b - (KV_{th}/2)$. Moreover, the total resistance in the series chain is equal to the sum of the resistors 44, 42 and the low field resistance of the diode 16. However, since the resistor 44 is much greater in value than either the low field resistance of the LSA diode 16 or the resistor 42, the sum may be substantially represented by the value of the resistor 44 or $R_h$. The current flowing in the series chain is therefore given by the following equation:

$$I_1 = \frac{KV_b - \frac{KV_{th}}{2}}{R_h} \qquad (3)$$

This current flowing in this series chain creates a voltage drop across the diode 16 and the resistor 42 (which is equal in value to the parasitic resistance) which may be calculated by the following equation:

$$V_1 = I_1\ (R_f + R_p) = K/(2R_h)\ (R_f + R_p)\ (2\ V_b - \overline{V_{th}}) \qquad (4)$$

where: $V_1$ is the voltage drop across the LSA diode 16 and the resistor 42 due to the current flowing in the aforementioned series chain.

Comparing equations (2) and (4) it becomes apparent that if the potential $V_1$ appearing across the diode 16 and the resistor 42 due to the series chain is maintained equal to a constant, the frequency of the microwave signal will likewise be maintained constant. Accordingly, the signal $V_1$ is maintained constant by sensing this signal during the interpulse time and comparing this signal to a reference signal in a differential amplifier or comparing device. The differential amplifier then produces a control signal if the signal $V_1$ is different from the reference signal and applies this control signal to the input terminals 24 of the controlled power supply 22 thereby to change the signal applied to the pulse modulator 14. This, in turn, changes the bias voltage applied to the LSA diode 16 until the difference between the sensed signal $V_1$ and the reference signal is eliminated whereby the frequency of the transmitter will be maintained constant.

More specifically, the signal $V_1$ is applied to the input terminals of a switch 46, the operation of which is responsive to the pulse modulator 14. The output terminals of the switch 46 are connected to one set of input terminals of a differential amplifier 50. The switch 46 is connected by a control lead 48 to the modulator 14. Thus, when the pulse modulator produces an output signal, the signal on the lead 48 closes the switch 46 to prevent the output signal from the modulator from reaching the differential amplifier 50. However, when no output signal is produced by the pulse modulator 14, the control signal on the lead 48 opens the switch 46 to permit the signal $V_1$ to reach the differential amplifier 50. Thus, the signal $V_1$ is sensed only during interpulse intervals. This switching arrangement is provided to prevent the pulse produced by the modulator from reaching the differential amplifier 50 since such pulse would completely mask the $V_1$ signal and produce erroneous results.

The other set of input terminals of the differential amplifier 50 are connected to a reference voltage supply 52 which supplies the reference signal to the differential amplifier. The output terminals of the different amplifier are connected to the control terminals 24 and the controlled power supply 22 by leads 56 and 58. The differential amplifier 50 is conventional in construction and produces an output signal which is proportional to the difference between the signals applied to each set of input terminals. This output signal of the differential amplifier 50 controls the output signal of the controlled power supply 22 in the direction and magnitude to cause the pulse modulator 14 to vary the bias voltage until the differences between the reference supply signal and the sensed signal from the switch 46 are essentially eliminated. Thus, this system forms substantially a closed loop servo mechanism to maintain the frequency of the transmitter constant.

In many applications it may be desirable to either vary the frequency of the transmitter in a known way or to change the frequency of the transmitter. Accordingly, a voltage control 54 may be connected to the reference supply 52 to change the value of the reference signal. Thus, changing the value of the reference signal will result in a change in frequency of the microwave signal in the manner indicated above.

As noted hereinabove, the frequency stabilization system thus far described senses the signal $V_1$ during interpulse intervals only and therefor produces a long-term stabilization of the transmitter. However, during the application of a pulse the diode dissipates heat and its low field resistance changes thereby producing short-term (per pulse) frequency variations. Thus, a short-term stabilizing network 35 connected between the modulator 14 and diode 16 may be provided which is operable to pre-distort the waveform from the modulator 14 to eliminate such short-term frequency chirps. This network is described more fully with respect to FIG. 6.

Accordingly, a transmitter employing an LSA diode as the frequency determining element has been provided which includes a frequency stabilization system for stabilizing the frequency of operation of the transmitter thereby to produce a reliable and efficient transmitter.

FIG. 3 illustrates a modified embodiment of a transmitter employing a frequency stabilization system constructed according to the present invention wherein the sensed signal appearing across the LSA diode is an alternating signal rather than a DC signal as in the embodiment of FIG. 2. More specifically, the transmitter of FIG. 3 which is designated generally by the reference numeral 60 is similar to the transmitter 20 of FIG. 2 and, accordingly, similar reference characters have been utilized to indicate identical elements and only the differences between the two transmitters will be described.

Accordingly, the series chain which produces the current $I_1$ includes a chopper 62 which is connected in series with the bias voltage supply 34. The chopper 62 converts the DC signal produced by the bias voltage supply 34 into an alternating signal and applies this to the diode 16 so that the signal $V_1$ appearing across the diode 16 and the resistor 42 will be an alternating signal. This signal $V_1$ is applied to the input terminals of the switch 46 the operation of which is responsive to the pulse modulator 14. The output terminals of the switch 46 are connected to one set of input terminals of differential amplifier 50.

The other set of input terminals of the differential amplifier 50 are connected to a synchronous AC reference voltage supply 66 which supplies the reference signal to the differential amplifier. The frequency of the reference signal is caused to be equal to the frequency of chopper 62 by a connecting lead 64 between chopper 62 and the synchronous AC reference voltage supply 66. Voltage control 68 may be connected to reference voltage supply 66 to change the amplitude of the reference signal in order to change the frequency of the microwave signal. Accordingly, the remainder of the system will operate in a manner described in conjunction with FIG. 2 to thereby stabilize the frequency of operation of the device.

The foregoing systems have assumed that the modulator 14 output signal $V_b$ is directly related to the input signal $KV_b$. However, in many applications this relationship does not hold true since the ambient temperature affects the operation of the modulator and thereby causes deviations in the relationship between the modulator input and output signals. Additionally, inherent in the operation of the modulator is the production of a ripple voltage which rides on the top of the pulse signal, as shown in FIG. 5A. Both of the above errors (i.e., the non-linearity in the operation of the modulator and the ripple voltage) introduce frequency deviations in the output signal. Accordingly, FIG. 4 illustrates a further modified embodiment of a transmitter which substantially eliminates the errors introduced by the modulator.

Figure 4:
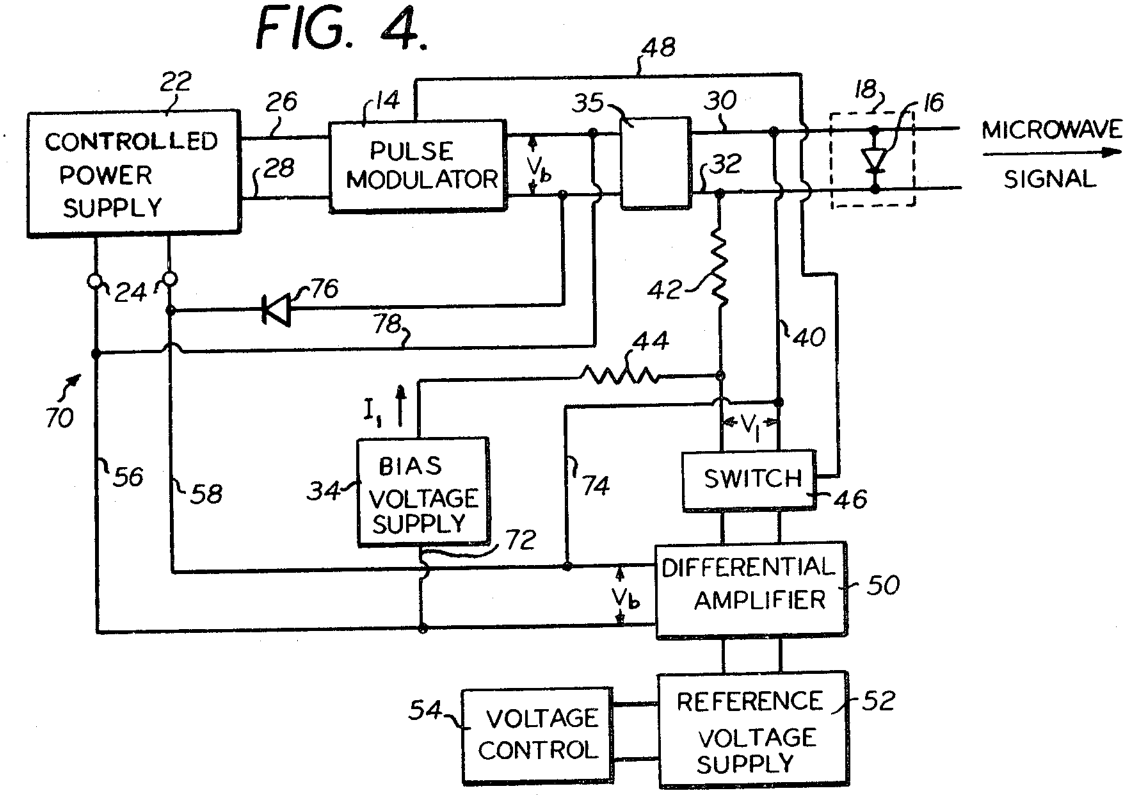
Figure 5A:
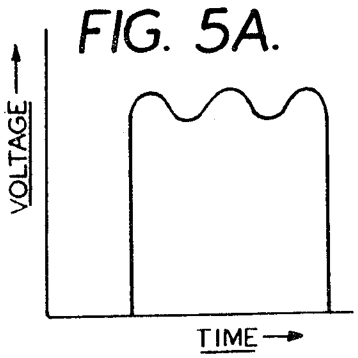
FIGS. 5A–5E illustrate waveforms appearing at different points of the circuits of FIGS. 1–4.

Thus in the embodiment of FIG. 4, the sensed signal appearing across the LSA diode is derived from the differential amplifier 50 rather than from the controlled power supply 22 as in the embodiment of FIG. 2. More specifically, the transmitter of FIG. 4 which is designated generally by the reference numeral 70 is similar to the transmitter 20 of FIG. 2 and, accordingly, similar reference characters have been utilized to indicate identical elements and only the differences between the two transmitters will be described.

Accordingly, the series chain which produces the current $I_1$ includes the bias voltage supply 34 having an input terminal connected to lead 56 by a lead 72, the resistor 44 which is connected to the output terminal of the bias voltage supply 34, and the resistor 42 which is connected between the resistor 44 and the lead 32. The series chain further includes a lead 74 which is connected between the lead 40 and the lead 58.

Figure 5B:
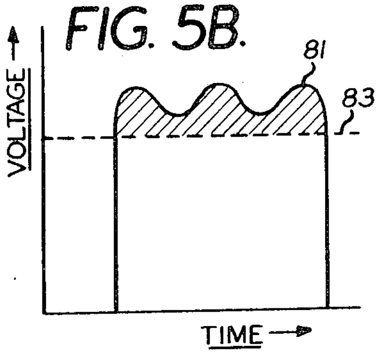
Figure 5C:
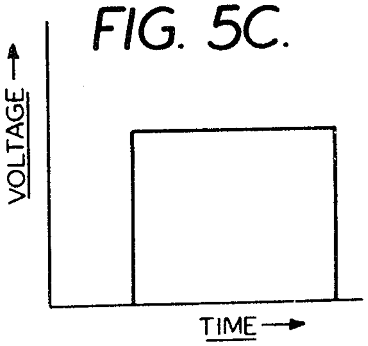

The output potential of the pulse modulator 14 is caused to be equal to the output potential $V_b$ of the differential amplifier 50 by connecting a clip diode 76 between lead 58 and lead 32 and by connecting a lead 78 between lead 56 and lead 30. Clip diode 76 causes the excess output potential of pulse modulator 14 over the output potential of differential amplifier 50 to be dissipated in pulse modulator 14. That is, if the output signal from modulator 14 rises above the level of the signal from the differential amplifier 50, the diode 76 becomes forward biased and the fractional increase circulates through the power supply 22 and is dissipated in the modulator 14. This is illustrated in FIG. 5B wherein the broken line 83 represents the potential above which the clip diode becomes forward biased.

The output potential of the bias voltage supply 34 is made equal to the quantity $-V_{th}/2$. The current flowing in the series chain is therefore given by the following equation:

$$I_1=\frac{V_b-\frac{V_{th}}{2}}{R_h} \quad (5)$$

The voltage drop across the diode 16 and the resistor 42 is given by the following equation:

$$V_1=I_1\,(R_f+R_p)=1/2R_h\,(R_f+R_p)\,(2V_b-V_{th}) \quad (6)$$

The remainder of the system will operate in the manner described in conjunction with FIG. 2 to thereby stabilize the frequency of operation of the device.

The previously discussed circuits provide long-term frequency stability for a pulsed diode transmitter. They constitute novel means of assuring that the operating frequency will remain constant from pulse to pulse. Moreover, if the short-term stabilizing network 35 is used, short-term stabilization is obtained.

Figure 6:
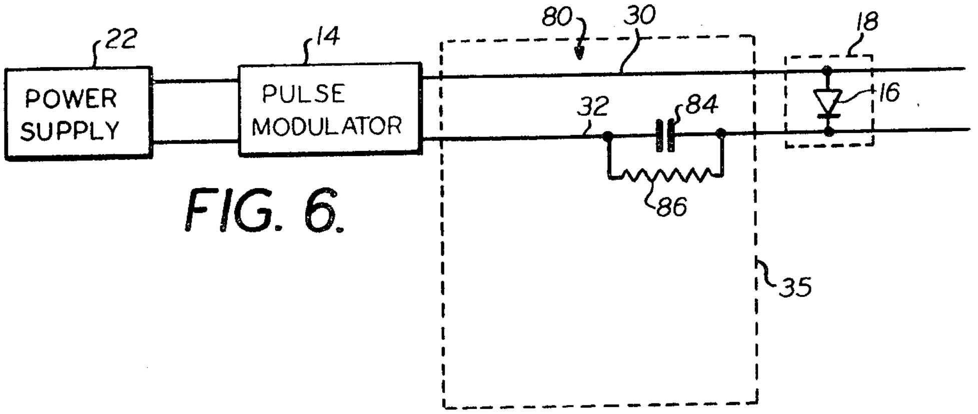
FIG. 6 is a schematic circuit wiring diagram, partially in block form, of a short term frequency stabilizing network constructed according to the present invention.

A transmitter utilizing one type of short-term frequency stabilization network 35 constructed in accordance with the present invention is illustrated in FIG. 6 and designated generally by the reference numeral 80. In the interests of clarity, the long-term feedback loop has been eliminated from the circuit of FIG. 6 although it is obvious that any one of the feedback frequency stabilization systems may be used. However, it is to be noted that the network 35 is connected between the modulator and the connections to the long-term stabilization system. The network 35 or 80 of FIG. 6 is operable to predistort the waveform applied to the diode to maintain the frequency of the transmitter substantially constant during the production of a pulse.

The transmitter includes the power supply 22, the pulse modulator 14, the LSA diode 16, the cavity 18, and the leads 30 and 32. A capacitor 84 is connected between the lead 32 and the LSA diode 16. A resistor 86 is connected across the capacitor 84.

Figure 5D:
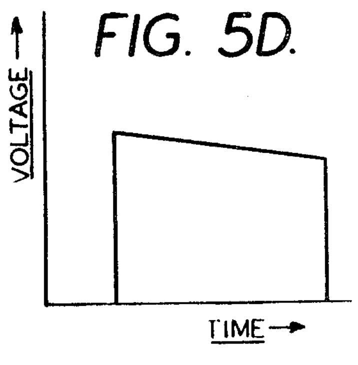

The signal from pulse modulator 14 is applied to the capacitor 84. During the pulse, capacitor 84 will begin to charge. As an increasing voltage develops across capacitor 84, a decreasing voltage is produced at the input of LSA diode 16 as shown in FIG. 5D. The rate at which the voltage input to LSA diode 16 declines is determined by the capacitance of the capacitor 84. An examination of Equation (1) shows that a declining bias voltage $V_b$ applied to the LSA diode will cause the operating frequency of the diode to decline. Accordingly, the value of the capacitor 84 is selected so as to cause the frequency rise due to heating of the diode during the pulse to be offset by the frequency fall due to declining bias voltage $V_b$ during the pulse, thereby producing the desired constant frequency output from the LSA diode.

The voltage charge that remains on the capacitor 84 after the pulse is completed must be removed prior to the application of the next pulse. Accordingly, resistor 86 is connected across capacitor 84. The time constant of this R-C network is selected so as to be much less than the time between pulses so as to dissipate this voltage charge in the resistor 86 rapidly.

Figure 7:
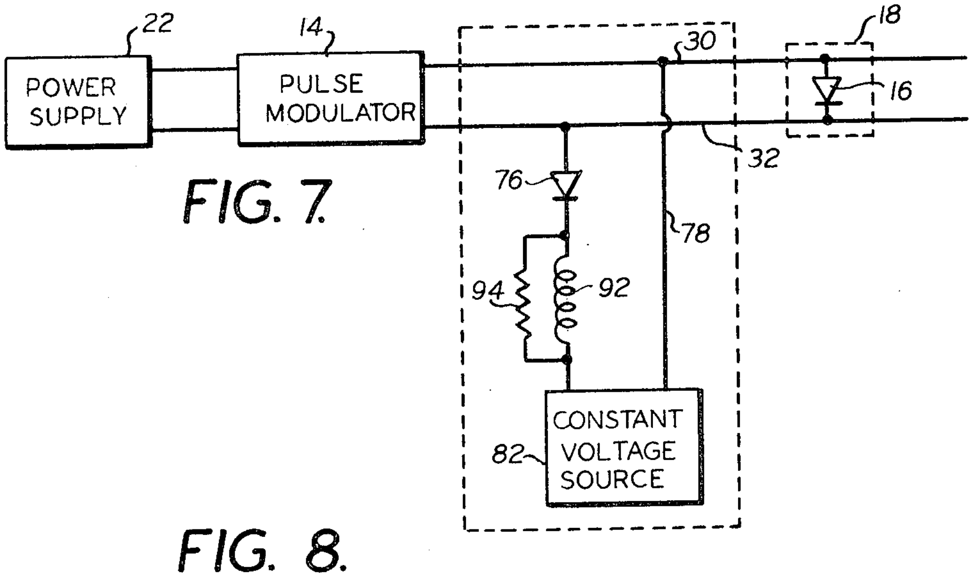
FIG. 7 is a schematic circuit wiring diagram, partially in block form, of a modified embodiment of a short term frequency stabilizing network for an LSA diode oscillator transmitter.

FIG. 7 illustrates an alternate embodiment of a transmitter utilizing a short term frequency stabilization network constructed in accordance with the present invention. This stabilization arrangement may be used alone or in combination with a compatible long-term stabilization system. This transmitter includes the power supply 22, the pulse modulator 14, the LSA diode 16, the cavity 18, the leads 30, 32, and 78, the clip diode 76, and the constant voltage source 82. An inductor 92 is connected between the clip diode 76 and the constant voltage source 82. A resistor 94 is connected across the inductor 92.

Figure 5E:
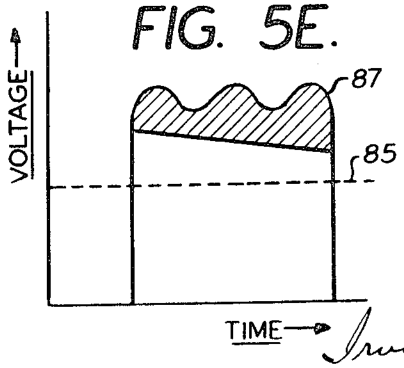

The operation of this circuit is similar to the operation of the preceding circuit and the waveform produced thereby is generally illustrated in FIG. 5E. The voltage of the constant voltage source 82 is designated as the broken line 85 in FIG. 5E. The voltage of pulse modulator 14 is designated as the curved line 87 in FIG. 5E. The voltage drop across inductor 92 and resistor 94 is the trapezoidal area immediately above the broken line 85, which voltage drop declines in accordance with well-known L-R circuit principles. The clip diode 76 causes the excess voltage of pulse modulator 14 over the sum of the voltage of source 82 and the voltage drop across inductor 92 and resistor 94 to be dissipated. This excess voltage is shown as the shaded area of FIG. 5E. Accordingly, the desired decreasing voltage is produced at the input of LSA diode 16, as shown in FIG. 5D.

Figure 8:
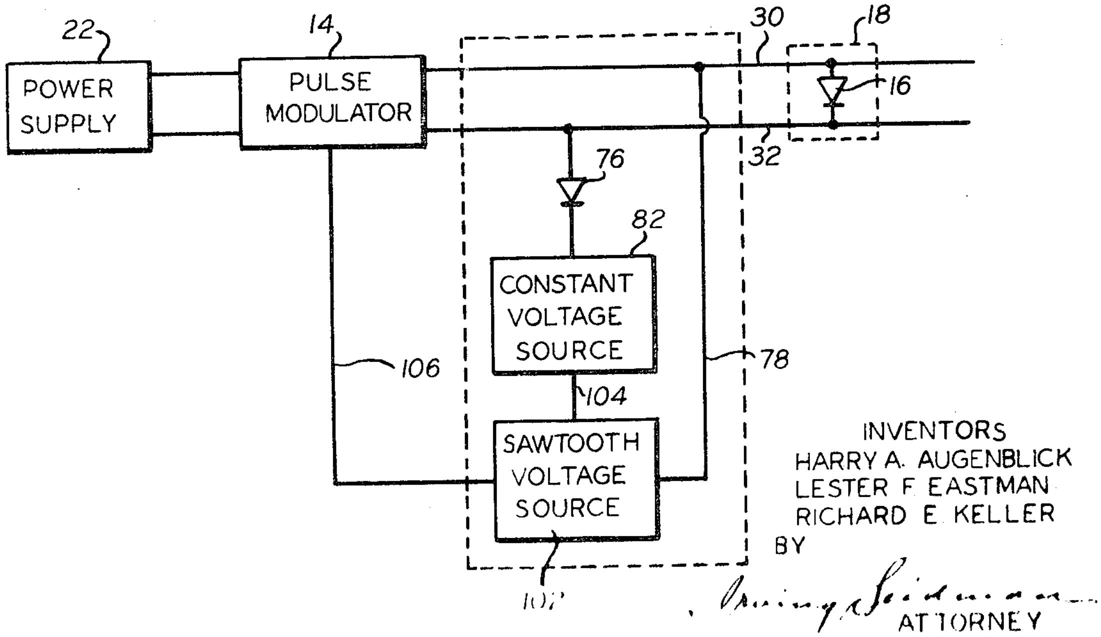
FIG. 8 is a schematic circuit wiring diagram, partially in block form, of a further modified embodiment of a short term frequency stabilizing network for a transmitter of the type under consideration.

FIG. 8 illustrates a further alternate embodiment of a transmitter utilizing a short-term stabilization network constructed in accordance with the present invention. This transmitter includes the power supply 22, the pulse modulator 14, the LSA diode 16, the cavity 18, the leads 30, 32, and 78, the clip diode 76, and the constant voltage source 82. A sawtooth voltage source 102 and a lead 104 are connected between the lead 78 and the constant voltage source 82.

The operation of the sawtooth voltage source 102 is responsive to the pulse modulator 14. The sawtooth voltage source 102 is connected by a control lead 106 to the modulator 14. Thus, when the pulse modulator provides an output, the signal on the lead 106 causes the sawtooth voltage source 102 to produce a trapezoidal voltage pulse in the form equal to the trapezoidal area immediately above the broken line 85 in FIG. 5E. Accordingly, the desired decreasing voltage is produced at the input of LSA diode 16, as shown in FIG. 5D.

While preferred embodiments of the invention have been shown and described herein, it will become obvious that numerous omissions, changes and additions may be made in such embodiments without departing from the spirit and scope of the present invention. For example, although the frequency stabilization system and transmitter of the present invention has been described in conjunction with the use of an LSA diode, it will be obvious that such frequency stabilization systems may be utilized in conjunction with other types of elements such as the semi-conductor elements referred to hereinabove. In addition, other methods of predistortion of the waveform from the modulator 14 to eliminate short-term frequency changes may be utilized.

What is claimed is:

1. A frequency stabilization system for stabilizing the frequency of a transmitter of the type comprising an oscillator having an active element the resonant frequency of which varies as a function of at least the resistance of said element and the value of a biasing signal applied to said element, control means responsive to a control signal for producing said biasing signal the value of which is dependent on the value of said control signal, and a lead connecting said control means with said element; said system comprising first signal means adapted to be connected to said element for producing a first signal which is proportional to said biasing signal whereby a second signal is developed across said element in response to the application of said first signal thereto from said first signal means, switch means having an input portion connected to said element and being selectively operable to connect said input with an output portion whereby said second signal appears at said output portion, a reference signal source, and comparing means connected to said reference signal source and the output portion of said switch means and adapted to be connected to said control means for comparing said second and reference signals to produce said control signal in accordance with the difference between said second and reference signals.

2. A frequency stabilization system as in claim 1, and reference varying means for varying the value of said reference signal.

3. A frequency stabilization system as in claim 1, in which said oscillator includes a parasitic resistance, and a resistor adapted to be connected in series with said element and having a value substantially equal to the value of said parasitic resistance, said switch means including lead means for connecting said switch means across the series circuit of said element and said resistor whereby said second signal includes the voltage drop across said resistor.

4. A frequency stabilization system as in claim 1, in which said comparing means comprises a differential amplifier.

5. A frequency stabilization system as in claim 1, in which said element has a threshold voltage and the resonant frequency of said element is proportional to the difference between the value of said biasing signal and said threshold voltage, said control means including a modulator for applying said biasing signal to said element, and a power source connected to said comparing means and responsive to said control signal for applying an energizing signal to said modulator which is proportional to said biasing signal; said first signal means comprising a source of potential connected to said element for producing a voltage proportional to the negative magnitude of said threshold voltage, and a lead for connecting the power source with said element whereby said first signal is proportional to the difference between the biasing signal and said threshold voltage.

6. A frequency stabilization system as in claim 3, in which said second signal is a DC signal, and said switch means is connected to said control means and is responsive to the absence of said biasing signal for passing only said second signal from the input to the output portion.

7. A frequency stabilization system as in claim 3, in which said second signal is an AC signal, and said switch means is connected to said control means and is responsive to the absence of said biasing signal for passing only said second signal from the input to the output portion, and said reference signal source comprises an AC source having the same frequency as said AC signal.

8. A frequency stabilization system as in claim 1, in which said element has a threshold voltage and the resonant frequency of said element is proportional to the difference between the value of said biasing signal and said threshold voltage, said control means including a modulator for applying said biasing signal to said element, and a power source connected to said comparing means and responsive to said control signal for applying an energizing signal to said modulator which is proportional to said biasing signal; said first signal means comprising a source of potential connected to said element for producing a voltage proportional to the negative magnitude of said threshold voltage, and a lead for connecting the comparing means with said element.

9. A frequency stabilization system as in claim 1, and clipping means connected to said control means for clipping the biasing signal above a preselected level.

10. A frequency stabilization system as in claim 9, in which said clipping means comprises a unidirectional current conducting device connected to the output terminals of said control means, and source means for biasing said unidirectional current conducting device to conduct current only when said biasing signal is above said preselected level.

11. A frequency stabilization system as in claim 1, in which the resistance of said element changes during the application of said biasing signal thereto, and predistortion means connected to said element for distorting said biasing signal in inverse relationship to the change in said resistance.

12. A frequency stabilized transmission apparatus comprising, in combination: an oscillator having an oscillating element the resonant frequency of which varies as a function of at least the resistance of said element and the value of a modulating signal applied to said element, a modulator connected to said oscillator for producing said modulating signal in response to an input signal, signal generator means connected to said modulator for generating said input signal in response to a control signal whereby the value of said input signal is dependent on the value of said control signal, and frequency stabilization means for stabilizing the frequency of operation of said oscillator; said frequency stabilization means comprising first signal producing means connected to said element for applying a first signal to said element which is proportional to said modulating signal whereby a second signal is developed across said element in response to the application of said first signal thereto, switch means having an input portion connected to said element and being selectively operable to connect said input portion with an output portion whereby said second signal appears at said output portion, a reference signal source, and comparing means connected to said signal generating means, the output portion of said switch means and said reference signal source for producing said control signal in accordance with the difference between said second and reference signals.

13. A frequency stabilized transmission apparatus as in claim 12, in which said element comprises a limited space-charge accumulation diode.

14. A frequency stabilized transmission apparatus as in claim 12, in which said reference signal source comprises a variable voltage supply whereby the value of said reference signal may be selectively varied to correspondingly vary the frequency of said oscillator.

15. A frequency stabilized transmission apparatus as in claim 12, in which said first signal producing means includes a lead connected between said signal generator means and said element and having a resistance therein, whereby said input signal is applied to said element through said resistance.

16. A frequency stabilized transmission apparatus as in claim 12, in which said element has a threshold voltage and the resonant frequency of said element is dependent on the difference between the value of said modulating signal and said threshold voltage, said first signal producing means comprising a source of potential for producing a voltage signal which is proportional to the negative magnitude of said threshold voltage, and a lead connecting said source of potential to said element whereby said first signal is proportional to the difference between said modulating signal and said threshold voltage.

17. A frequency stabilized transmission apparatus as in claim 16, in which said oscillator includes a parasitic resistance, and a resistor connected in series with said element whereby said first signal is applied across said series resistor and said element, said resistor having a value substantially equal to said parasitic resistance, said switch means including a lead for connecting said sensing means across the series circuit of said element and said resistor whereby said second signal includes the voltage drops across said element and said resistor.

18. A frequency stabilized transmission apparatus as in claim 12, in which said second signal is a DC signal, and said switch means comprises a switch connected with said modulator and responsive to the absence of said modulating signal for passing only said second signal.

19. A frequency stabilized transmission apparatus as in claim 12, in which said second signal is an AC signal, and said switch means is connected with said modulator to pass said second signal only when said modulating signal is not present, and said reference signal source comprises an AC source synchronized with said AC signal.

20. A frequency stabilized transmission apparatus as in claim 12, and clipping means connected to said modulator for clipping said modulating signal above a preselected level.

21. A frequency stabilized transmission apparatus as in claim 20, in which the resistance of said oscillator changes during the application of said modulating signal, and predistortion means connected to said modulator for predistorting said modulating signal in inverse relationship to said change in resistance.

22. A frequency stabilized transmission system as in claim 21, in which said predistortion means comprises the parallel circuit of a capacitor and a resistor connected between said modulator and said oscillator.

23. A frequency stabilization system for stabilizing the frequency of a circuit containing an element whose frequency varies in accordance with the relationship $$(R_f + R_p)\ (2\ V_b - V_{th})$$

wherein:

$R_f$ is the low field resistance of the element;
$R_p$ is the parasitic resistance of the circuit;
$V_{th}$ is the threshold voltage of the element; and
$V_b$ is the bias voltage applied to said element comprising first signal means for producing a first signal proportional to the difference between said bias and threshold voltages, a lead connecting said first signal means with said element to apply said first signal thereto whereby a second signal is developed across said element which is proportional to the product of said low field resistance and said first signal, switch means having an input portion connected to said elementment and being selectively operable to connect said input with an output portion whereby said second signal appears at said output portion and bias varying means connected to the output portion of said switch means for varying the bias voltage applied to said element until said relationship is substantially equal to a preselected constant.

24. A frequency stabilization system as in claim 23, and a resistor connected in series with said first signal means and said element and having a resistance substantially equal to said parasitic resistance, said switch means comprising a lead connecting said switch means across said resistor and said element, whereby said second signal is proportional to the product of the sum of said resistor and low field resistance and said first signal.

25. A frequency stabilization system as in claim 23, in which said bias varying means comprises first means for applying said bias voltage to said element in response to a control signal, a reference signal source for producing a reference signal proportional to said preselected constant, comparing means for comparing said reference and second signals and for producing said control signal in accordance with the difference therebetween, and a lead connecting said control means to said first means to apply said control signal thereto.

26. A frequency stabilization system as in claim 23, in which said low field resistance changes during the application of said bias voltage to said element, and predistortion means connected to said element for changing said bias voltage inversely to said change in low field resistance to maintain said relationship equal to said constant.

27. A method of stabilizing the frequency of a transmitter of the type comprising: an oscillator having an active element the resonant frequency of which varies as a function of at least the resistance of said element and the value of a biasing signal applied to said element, control means responsive to a control signal for producing said biasing signal the value of which is dependent on the value of said control signal, and a lead connecting said element and control means, said method comprising producing a first signal which is proportional to said biasing signal, applying said first signal to said element to produce a second signal in response thereto, comparing said second signal with a reference signal, and producing said control signal in accordance with the difference between said second and reference signals.

28. The method of claim 27, including the step of changing the value of reference signal to produce a corresponding change in the frequency of said element.

29. The method of claim 27, wherein the element has a threshold voltage and the resonant frequency of the element is proportional to the difference between the value of the biasing signal and said threshold voltage, said method comprising the steps of making said first signal proportional to the difference between said biasing signal and said threshold voltage.

30. The method of claim 27, including the step of clipping the biasing signal above a preselected level.

31. The method of claim 27, in which the resistance of said element varies as said biasing signal is applied to said element, said method including the step of varying said biasing signal to eliminate the effects of said variations in resistance.

32. Apparatus for stabilizing the frequency of the transmitter of the type having an oscillator having an active element the frequency of which varies as a function of the resistance of the element and the value of a modulating signal applied to said element and wherein the resistance of said oscillator changes during the application of said modulating signal; said apparatus comprising predistortion means for predistorting said modulating signal in inverse relationship to said change in resistance, said predistortion means comprising limiting means for limiting the maximum amplitude of said modulating signal to preselected level, and waveform varying means for changing the waveform of said modulating signal to produce a modulating signal which slopes in a direction opposite to said change in resistance.

33. Apparatus as in claim 32, in which said limiting means comprising clipping means for clipping said modulating signal.

34. Apparatus as in claim 33, in which said clipping means comprises a voltage source, and a unidirectional current conducting device adapted to be connected between a modulating signal source and said voltage source and polarized to conduct current when the amplitude of said modulating signal rises above said voltage source.

35. Apparatus as in claim 33, in which said waveform varying means comprises the parallel connection of a resistor and a capacitor adapted to be connected between said limiting means and said element.

36. Apparatus as in claim 34, in which said waveform varying means comprises the parallel connection of an inductor and a resistor connected between said unidirectional current conducting device and said voltage source.

37. Apparatus as in claim 34, in which said waveform varying means comprises a sawtooth voltage generator connected to said voltage source and responsive to said modulating signal for producing a sawtooth signal.

* * * * *